Patented Nov. 23, 1926.

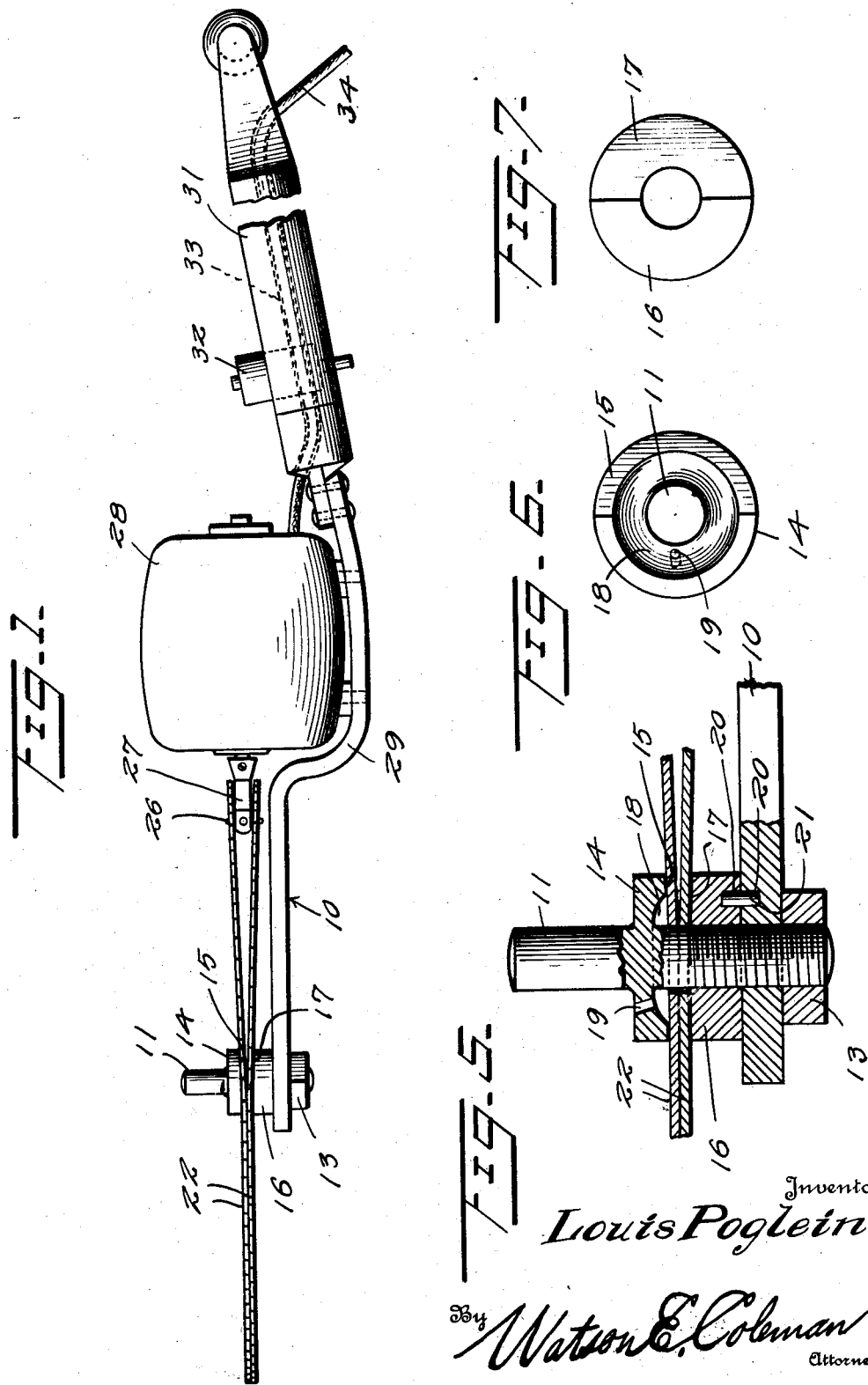

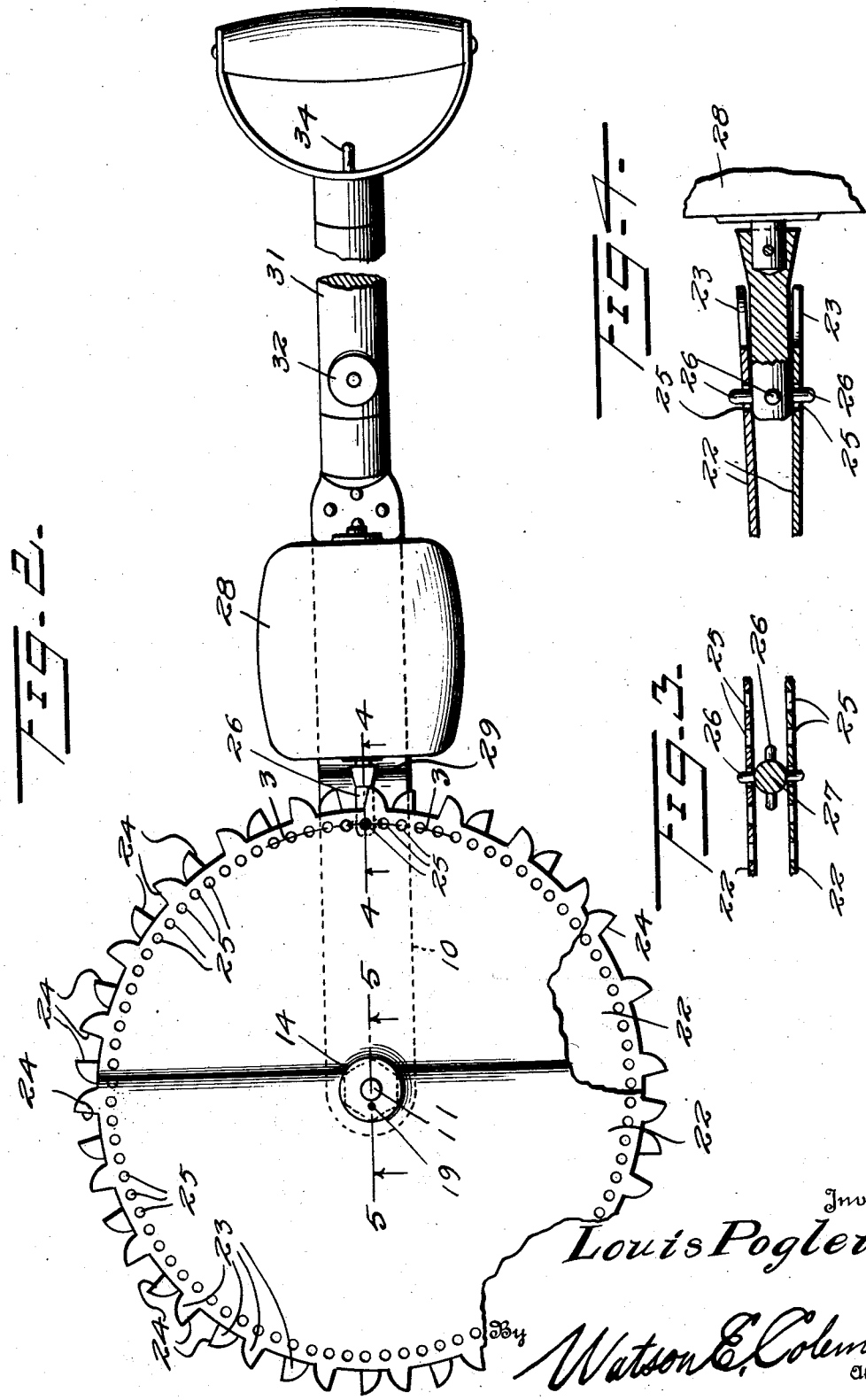

1,608,031

UNITED STATES PATENT OFFICE.

LOUIS POGLEIN, OF JEANNETTE, PENNSYLVANIA.

HEDGE OR SHRUB TRIMMING IMPLEMENT.

Application filed July 7, 1926. Serial No. 120,984.

This invention relates to hedge or shrub trimming implements and more particularly to a motor driven hedge trimmer.

An important object of the invention is to provide a device of this character including toothed disks and means for driving these disks in opposite directions by means of a single gear operated from a suitable power drive, preferably consisting of a motor.

A further and more specific object of the invention is to produce a device of this character in which the disks themselves are made in the form of gears and a drive gear is associated therewith in such manner as to cause certain portions of the peripheries of the disks to be maintained in contact with one another and to drive the disks in opposite directions.

These and other objects I attain by the construction shown in the accompanying drawings, wherein for the purpose of illustration is shown a preferred embodiment of my invention and wherein:—

Figure 1 is a side elevation of a hedge trimmer constructed in accordance with my invention;

Figure 2 is a plan view thereof;

Figure 3 is an enlarged sectional view on the line 3—3 of Figure 2;

Figure 4 is a similar section on the line 4—4 of Figure 2;

Figure 5 is an enlarged section on the line 5—5 of Figure 2;

Figure 6 is a bottom plan view of the pivot member;

Figure 7 is a top plan view of the washer.

Referring now more particularly to the drawings, the numeral 10 generally indicates a suitable support upon which at one end a pivot member 11 is so mounted that it is held against rotation. In the present instance, the pivot is shown as threaded through the support at 12 and provided at one face of the support with a lock nut 13 jamming against the support. At the opposite side of the support, the pivot is provided with a flange 14, the under surface of which is spaced from the support and is relieved, as at 15. Between the flange 15 and the face of the support, a washer 16 is disposed, the upper surface of which is relieved, as at 17, at the same side as the flange 15. This relief extends through approximately one-half the circumference of both the flange and washer, so that adjacent faces of the flange and washer at that side of the pivot directed toward the opposite end of the support diverge from one another. The under surface of the flange 15 is recessed to provide an oil chamber 18 and the flange has formed therethrough a duct 19 through which oil may be introduced to this chamber. The washer 16 is held from rotation with relation to the support 10 and the pivot 11 in any suitable manner. In the present instance, adjacent faces of the support and washer are formed with sockets 20 receiving the ends of the pin 21 and serves to prevent rotation.

Between adjacent faces of the flange and washer a pair of disks 22 are mounted upon the pivot 11. These disks are exactly similar but are reversely applied to the pivot. Each disk is provided upon its periphery with cutting teeth 23, cutting faces 24 of which, by the reverse application of the disks to the pivot, face in opposite directions. Adjacent the peripheries, the disks are formed with circumferentially spaced openings 25, so that each disk comprises a female opening of a pin gearing, the male member 26 of which is formed upon the end of a shaft 27 which is inserted between the openings in alignment with the support and above the support. The disks are sprung to permit disengagement and accordingly resiliently engage with opposite side faces of the pin or male gear, so that a positive engagement therewith is provided. This engagement will likewise serve to resiliently urge the opposite portions of the disk into engagement with one another, so that they are properly positioned for the cutting operation. Any suitable mechanism may be provided for driving the shaft 27. I prefer and, in the present construction, illustrate a motor 28 secured to the support 10 and engaged with this shaft. The support 10 is shown as offset at 29, so that the armature shaft 30 of the motor may axially align with the shaft 27. The support may be provided with any suitable handle 31 and upon this handle a control 32 for the drive mechanism is situated. This control, in the present instance, comprises a switch controlling the action of the motor. The handle 31 is illustrated as having a bore 33 through which the leads 34 may extend to the motor.

Since the construction hereinbefore set forth is capable of a certain range of change and modification without materially departing from the spirit of the invention, I do not limit myself to such specific structure except as hereinafter claimed.

I claim:—

1. In combination, a support, a pivot mounted thereon, a pair of resilient disks mounted upon the pivot provided upon their peripheries with oppositely facing cutting teeth, means associated with the disks at the pivot permitting separation of the disks at one side of the pivot and preventing separation thereof at the opposite side of the pivot and a rotating driving means for the disks inserted between the outer edge portions of the disks at the first named side of the pivot and with which the disks are maintained in engagement by their resiliency.

2. In combination, a support, a pivot mounted thereon, a pair of resilient disks mounted upon the pivot provided upon their peripheries with oppositely facing cutting teeth, means associated with the disks at the pivot permitting separation of the disks at one side of the pivot and preventing separation thereof at the opposite side of the pivot and a rotating driving means for the disks inserted between the outer edge portions of the disks at the first named side of the pivot and with which the disks are maintained in engagement by their resiliency, said disks adjacent the peripheries thereof being provided with a circumferentially extending series of openings, the driving member having pins for engagement in said openings.

3. In combination, a support, a pivot mounted thereon, a pair of resilient disks mounted upon the pivot provided upon their peripheries with oppositely facing cutting teeth, means associated with the disks at the pivot permitting separation of the disks at one side of the pivot and preventing separation thereof at the opposite side of the pivot and a rotating driving means for the disks inserted between the outer edge portions of the disks at the first named side of the pivot and with which the disks are maintained in engagement by their resiliency, said disks adjacent the peripheries thereof being provided with a circumferentially extending series of openings, the driving member having pins for engagement in said openings, a motor carried by the support and a driving connection between the armature shaft of the motor and said driving member.

4. In combination, a support, a pivot mounted thereon, a pair of resilient disks mounted upon the pivot provided upon their peripheries with oppositely facing cutting teeth, means associated with the disks at the pivot permitting separation of the disks at one side of the pivot and preventing separation thereof at the opposite side of the pivot comprising a flange upon the pivot, a washer surrounding the pivot between the flange and support, the flange and washer having adjacent faces thereof relieved at said side of the pivot and a rotating driving means for the disks inserted between the outer edge portions of the disks at the first named side of the pivot and with which the disks are maintained in engagement by their resiliency.

5. In combination, a support, a pivot mounted thereon, a pair of resilient disks mounted upon the pivot provided upon their peripheries with oppositely facing cutting teeth, means associated with the disks at the pivot permitting separation of the disks at one side of the pivot and preventing separation thereof at the opposite side of the pivot and a rotating driving means for the disks inserted between the outer edge portions of the disks at the first named side of the pivot and with which the disks are maintained in engagement by their resiliency, said disks adjacent the peripheries thereof being provided with a circumferentially extending series of openings, the driving member having pins for engagement in said openings, a motor carried by the support and a driving connection between the armature shaft of the motor and said driving member, the handle being offset to permit axial alignment of the armature shaft of the motor with said driving member.

In testimony whereof I hereunto affix my signature.

LOUIS POGLEIN.